US008180822B2

(12) United States Patent  (10) Patent No.: US 8,180,822 B2
Rarick  (45) Date of Patent: May 15, 2012

(54) METHOD AND SYSTEM FOR PROCESSING THE BOOTH ENCODING $33^{RD}$ TERM

(75) Inventor: Leonard D. Rarick, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 924 days.

(21) Appl. No.: 12/203,644

(22) Filed: Sep. 3, 2008

(65) Prior Publication Data

US 2010/0057824 A1  Mar. 4, 2010

(51) Int. Cl.
*G06F 7/38* (2006.01)
*G06F 7/52* (2006.01)
(52) U.S. Cl. .......... 708/501; 708/503; 708/625
(58) Field of Classification Search ............ 708/501, 708/503, 625
See application file for complete search history.

(56) References Cited

U.S. PATENT DOCUMENTS

| 5,993,051 A * | 11/1999 | Jiang et al. ............ 708/501 |
| 6,275,838 B1 * | 8/2001 | Blomgren et al. ........ 708/501 |
| 2008/0275931 A1 * | 11/2008 | Schmookler ............ 708/501 |

* cited by examiner

*Primary Examiner* — Chuong D Ngo
(74) *Attorney, Agent, or Firm* — Osha • Liang LLP

(57) ABSTRACT

A computer system for computing a binary operation involving a first term multiplied by a second term resulting in a product, where the product is conditionally added to a third term in a central processing unit. The central processing unit includes a carry save adder configured to add a plurality of partial products obtained from the product of the first term and the second term to obtain a first partial result and a second partial result, a multiplexer configured to output one selected from the group consisting of the second term, the third term, and zero, and an alignment shifter configured to shift an output of the multiplexer to align the output of the multiplexer with the first partial result and the second partial result to obtain a shifted term. The shifted term, the first partial result and the second partial result are added together to obtain a result of the binary operation.

10 Claims, 5 Drawing Sheets

METHOD AND SYSTEM FOR PROCESSING THE BOOTH ENCODING 33$^{RD}$ TERM

BACKGROUND

In computing, an arithmetic logic unit (ALU) is a digital circuit that performs arithmetic and logical operations, that is typically part of the central processing unit (CPU) of the computing system. The ALU of a computing system typically includes hardware, such as adders, shifters, and muxes for performing the arithmetic calculations on binary numbers.

Multiplying large binary numbers can be challenging to implement in hardware. Multiplication typically occurs by creating partial products for each binary digit that is multiplied by another binary number, and then adding all the partial products together, until the final product sum is obtained. The multiplication of binary digits is fairly simple because either the same binary number is copied, when the multiplier is 1 or a set of zeros is used, when the multiplier is 0. However, after all the partial products are obtained, adding up the partial products is the more challenging aspect of binary multiplication. Often times, to reduce the number of partial products created in an N by N binary multiplication, Booth Encoding is employed. Booth Encoding is a well known method used in some hardware implementations of multiplication. In implementing an N by N multiplication, without Booth encoding, one creates N partial products to be added together to find the product. However, using Booth encoding, the number of terms is approximately cut in half. If N is even, Booth encoding results in (N/2)+1 partial products to be added together. If N is odd, then (N+1)/2 partial products are obtained. When Booth Encoding is employed, the number of arithmetic hardware components used to perform the multiplication may be reduced.

A common case is when the multiply hardware is used for integer and floating point applications. The integer multiplies can be for 32 by 32 bits or for 64 by 64 bits. The most common floating point formats are single precision (24 by 24 bit mantissa multiplies) and double precision (53 by 53 bit mantissa multiplies). In order to handle all these cases in a single ALU, a 64 by 64 bit multiply needs to be provided in hardware. Thus, because N is even here (i.e., 64), 64/2+1 partial products, or 33 partial products are created using booth encoding.

In order to add up the partial products, first a carry save adder tree is used, often called a Wallace tree. This quickly combines the partial products until only the last two terms remain to be added. These two terms are then added with a carry look-ahead adder to obtain the result of the multiply. The carry save adder may use full adders (also called 3 to 2 compressors), 4 to 2 compressors, or 5 to 3 compressors. Often times, because 4 to 2 compressors are more efficient than 3 to 2 compressors, 4 to 2 compressors are preferred. In the case where there are only 32 partial products instead of 33, then the first level of execution using 4 to 2 compressors would compress 32 partial products to 16. The second level would compress the 16 to 8. The third level would compress the 8 to 4. Finally, the fourth and last level would compress the 4 to 2, and these two would be added together using, for example, a carry-look ahead adder to obtain the product result.

However, in this case, there still is the 33rd term that has not yet been accounted for. To solve this problem, a combination of 4 to 2 compressors are used along with 3 to 2 compressors. For example, the IBM power 6™ computer uses 4 to 2 for the first level, 3 to 2 for the second and third levels, and 4 to 2 for the fourth and fifth levels. Such an implementation uses five levels of hardware.

Today, for floating point operations, most computing systems provide functionality to perform both a multiply and an addition to the multiplied product. That is, the major floating point units today provide for the floating point multiply-add function, where (A*B)+C is computed. While the Booth encoding and carry save addition described above is implemented for the A*B part of the operation, the C input is shifted to align its binary point with the binary point of the product, A*B. When both the alignment and the carry save adder are finished, the two terms from the carry save adder and the aligned C term are combined with 3 to 2 compressors, the result of which then goes to the carry look-ahead adder to complete the multiply add operation.

For the floating point operations, the entire 64 by 64 array is not used since the largest inputs for double precision floating point operations is 53×53. The portion that is used may be placed anywhere within the larger array. In particular, it may be placed so that the 33rd term in the Booth encoding is known to be zero and therefore is not created or used in the carry save adder. In this case, only 32 terms need be provided for, and the carry save adder may contain only four levels of 4 to 2 compressors.

SUMMARY

In general, in one aspect, the invention relates to a computer system for computing a binary operation comprising a first term multiplied by a second term, and a third term conditionally added to a product of the first term and the second term in a central processing unit. The central processing unit comprises a carry-save adder configured to add a plurality of partial products obtained from the product of the first term and the second term to obtain a first partial result and a second partial result; a multiplexer configured to output one selected from the group consisting of the second term, the third term, and zero; and an alignment shifter configured to shift an output of the multiplexer to align the output of the multiplexer with the first partial result and the second partial result to obtain a shifted third term. The shifted third term, the first partial result and the second partial result are added together to obtain a result of the binary operation.

In general, in one aspect, the invention relates to a method for performing a binary operation, comprising obtaining a first term to be multiplied by a second term to obtain a plurality of partial products, wherein the plurality of partial products are added together using a carry-save adder to obtain a first partial result and a second partial result, shifting a third term using an alignment shifter to obtain a shifted third term, adding the shifted third term to the first partial result and the second partial result, wherein the binary operation is a 64 by 64 bit integer multiply operation, wherein the plurality of partial products is reduced using Booth's Encoding Algorithm, wherein the third term is an extra partial product obtained when reducing the plurality of partial products using Booth's Encoding Algorithm, and wherein the alignment shifter is used to supply a shifted third term to full adders to add the extra partial product to the first partial result and a second partial result.

Other aspects of the invention will be apparent from the following description and the appended claims.

DETAILED DESCRIPTION

Figure 1:
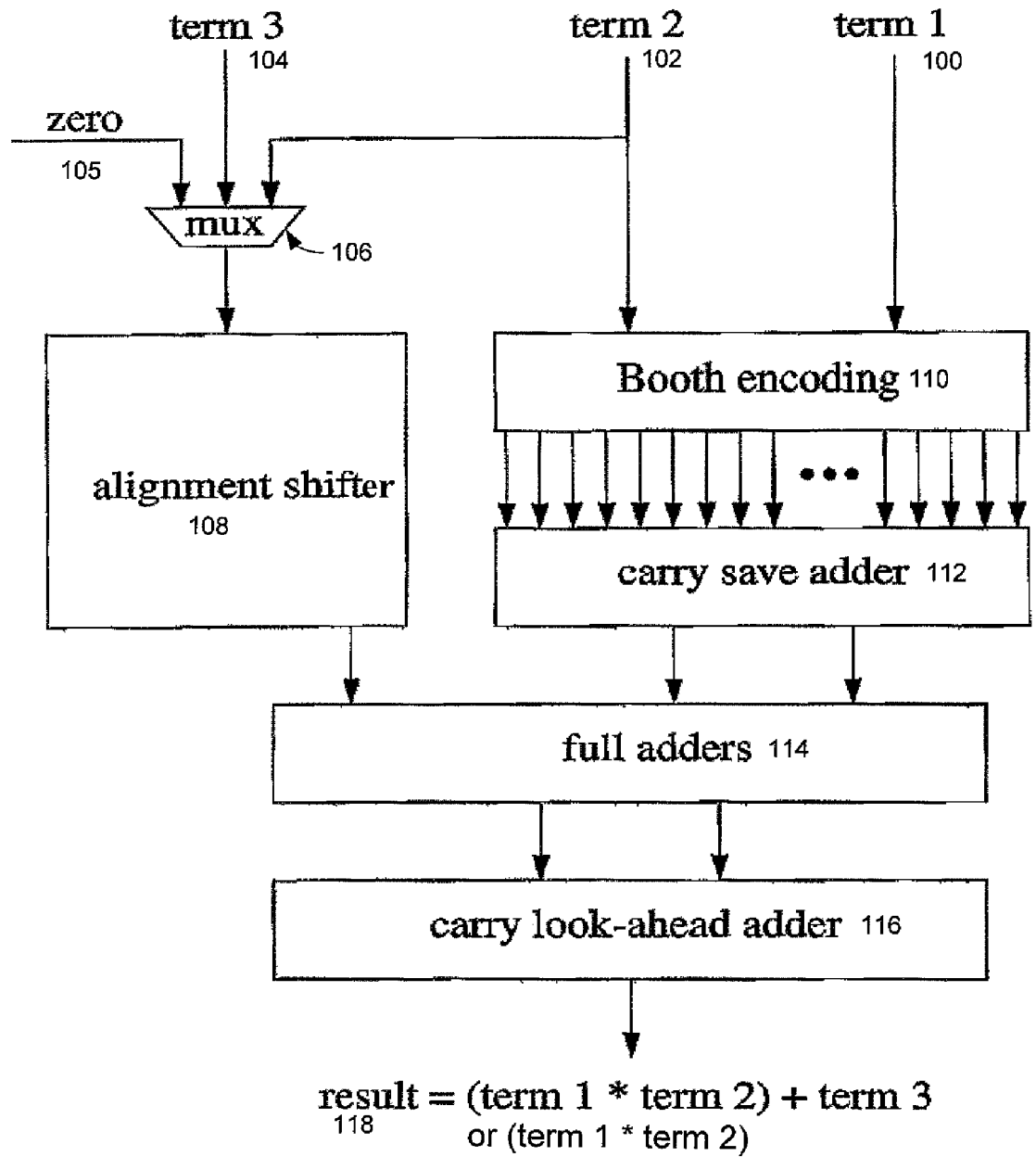
FIG. 1 shows system hardware for a multiply-accumulate implementation in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for an efficient implementation for performing binary arithmetic operations in hardware. Specifically, embodiments of the invention provide a method and system for performing a large binary integer multiplication using the hardware already present in the computing system for floating point operations. More specifically, embodiments of the invention use the alignment shifter, typically used to perform a floating point multiply-add operation, to add an extra partial product to the remaining partial products in an integer multiply operation.

FIG. 1 shows a hardware implementation of a binary multiply-add (also known as a multiply-accumulate) operation in accordance with one or more embodiments of the invention. In one or more embodiments of the invention, FIG. 1 shows term 1 (100), term 2 (102), term 3 (104), a multiplexer ("mux") (106), an alignment shifter (108), a booth encoding algorithm (110), a carry save adder (112), fill adders (114), a carry look-ahead adder (116), and a result (118). Each of the aforementioned elements of FIG. 1 are described below.

In one or more embodiments of the invention, FIG. 1 is a hardware implementation of the binary operation (term 1(100)*term 2 (102))+term 3 (104). In one or more embodiments of the invention, the aforementioned operation applies to a floating point multiply-add operation, where term 3 (104) is a separate third term to be added to the result of the product of term 1 (100) and term 2 (102). In addition, the aforementioned operation also applies to 64×64 bit integer multiply operations, i.e., term 1 (100)*term 2 (102), where term 3 (104) is ignored and the output of the mux (106) is a $33^{rd}$ term (i.e., a $33^{rd}$ partial product) which is either term 2 (102) or zero (105). Said another way, in one or more embodiments of the invention, the output of mux (106) may represent distinct entities based on whether a floating point multiply-add is performed or a 64×64 bit integer multiply is performed, but the output of the mux (106) is logically implemented using the same method in hardware. More specifically, the output of the mux (106) may be the $33^{rd}$ Booth encoding partial product or a third term to be added to a product of two terms in a floating point multiply-add operation. In one or more embodiments of the invention, the hardware shown in FIG. 1 represents both scenarios for the output of mux (106) described above.

Continuing with FIG. 1, the mux (106) is a multiplexer that takes three inputs and provides a single output based on multiplexer logic that is discussed below in FIG. 2. Specifically, in one or more embodiments of the invention, the mux (106) takes term 2 (102), term 3 (104), and zero (105) as inputs, and provides the single output of one of the aforementioned three inputs into the alignment shifter (108). Those skilled in the art will appreciate that circuits that provide equivalent results without having explicit zeros as an input also exist and are well known in the art. The alignment shifter (108) is used to shift the output of the mux (106) (i.e., term 2 (102), term 3 (104), or zero) such that the binary point of the term that is provided by the alignment shifter is in the correct place for adding to the partial products resulting from the multiplication of term 1 (100) and term 2 (102).

As discussed above, Booth Encoding (110) performs the Booth encoding algorithm to reduce the number of original partial products obtained from a binary multiplication operation by approximately half. The carry save adder (112) includes several 4 to 2 compressors and is configured to add the partial products until only two partial products remain to be added. The alignment shifter (108) and the carry save adder (112) are both operatively connected to a set of full adders (114) that adds the two partial products from the carry save adder (112) and the shifted result from the alignment shifter (108). The operation concludes when the carry lookahead adder (116) adds both terms output from the full adders (114) and obtains a result (118) for the operation (term 1 (100)*term 2 (102))+term 3 (104) for floating point multiply-add operations, or term 1 (100)*term 2 (102) for integer multiply operations.

In one or more embodiments of the invention, the multiplication of term 1 (100) and term 2 (102) and the shifting of the term that is sent to the alignment shifter (108) occurs at the same time, in two different portions of the ALU/CPU of the computing device. Thus, while the multiplication and reduction of the number of partial products to two remaining partial products is performed in one area of the CPU, the alignment shifter is working to determine how many places the third term needs to be shifted, and shifting the third term accordingly.

In one or more embodiments of the invention, using the hardware described in FIG. 1 results in three total partial products that are input into the full adders (114). The three partial products include two partial products resulting from the compressors that compress all the originally obtained partial products from the multiplication of term 1 (100) and term 2 (102) down to two partial products, and a third term to be added to the multiplication result. As described above, in one embodiment of the invention, the third term is the $33^{rd}$ partial product obtained when Booth Encoding is applied to a 64×64 bit integer multiplication. Alternatively, in one or more embodiments of the invention, the third term may be the term that is added in a floating point multiply-add operation.

In one or more embodiments of the invention, the 33rd term is only needed for the integer 64 by 64 bit multiply. However, in the scenario of a 64×64 bit integer multiply, there is no C term to be sent to the alignment shifter because the multiply-add operation (for which the alignment shifter is typically employed) is only used for floating point operations. Instead of sending zeros through the alignment shifter, or keeping the alignment shifter idle when a 64×64 bit Booth Encoding integer multiply is performed, the 33rd term is sent through the alignment shifter. Thus the carry save adder (112) need only combine 32 partial products instead of 33, which is smaller, faster, and consumes less power.

Those skilled in the art of using Booth Encoding will appreciate that the Kth partial product input into the carry save adder, for K>1, contains not only the kth Booth Encoding term but also the sign bit for the k-$1^{st}$ Booth Encoding term, positioned two places to the right of the least significant bit of the kth booth Encoding term. Those skilled in the art will further appreciate that for k=1, there is no zeroth Booth Encoding term, so no additional sign bit is needed. Also, the last Booth Encoding term is always positive, so its sign bit is always zero and may be ignored. However, the last partial product, which is the $33^{rd}$ partial product for a 64×64 bit integer multiply, needs to include the sign bit of the $32^{nd}$ Booth Encoding term as well as the $33^{rd}$ Booth Encoding term. So, for a 64×64 bit integer multiply, the $33^{rd}$ partial product needs to be 66 bits long to include the sign bit of the $32^{nd}$ Booth Encoding term.

Those skilled in the art will also appreciate that the number of bits that is aligned in a double precision floating point operation is 53, which represents the size of the standard double precision mantissa. Thus the input to the alignment shifter is 53 bits and so there are 13 bits that must be included in the carry save adders for a 64×64 bit integer multiply. However, if these are the 13 most significant bits, then 32 terms is still sufficient since the most significant bit positions have far fewer terms than the maximum case of 32.

Figure 2:
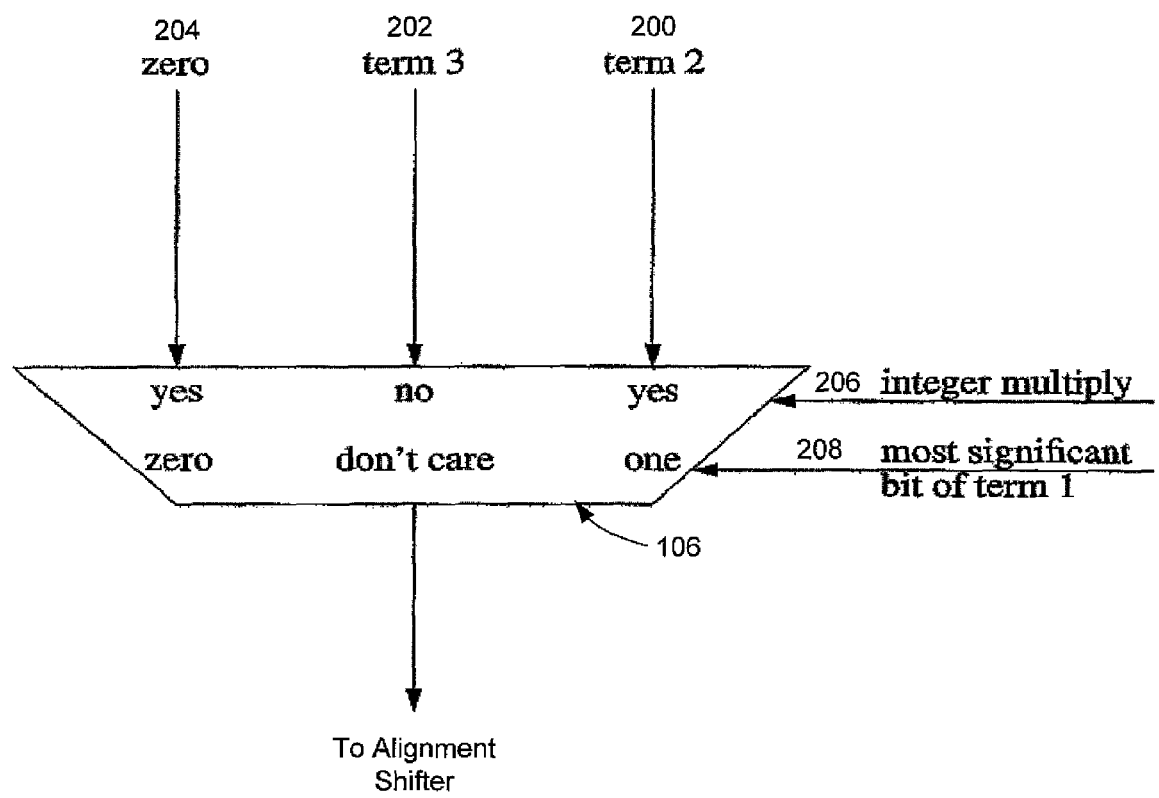
FIG. 2 shows a multiplexer selection for an alignment shifter in accordance with one or more embodiments of the invention.

FIG. 2 shows the multiplexer (mux) (106) of FIG. 1 in more detail in accordance with one or more embodiments of the invention. The mux (106) is used to select the data entity that is sent to the alignment shifter. In one or more embodiments of the invention, when an integer multiply (206) is performed, the mux logic selects term 2 (200) (i.e., the multiplier) if the most significant binary bit in the multiplicand (term 1) (208) is a one. Thus, the mux (106) is configured to output the second term and a most significant bit of the first term, when the most significant bit of term 1 (208) is a one. Alternatively, when the most significant bit of term 1 (208) is a zero, the mux selects all zeros and sends the zeros (204) to the alignment shifter. Thus, in one or more embodiments of the invention, the 33rd term is either all zeros or a copy of the non-booth encoded multiply input (i.e., term 2). In particular, the full booth encoding is not used to determine the value of the 33rd term. After each partial product is added using a carry save adder (not shown), any extra partial product that is remaining after all the other partial products have been added and reduced down to two partial results, is sent instead of the output of the mux (108) through the alignment shifter and added to the two partial results. In one or more embodiments of the invention, output of the mux is the $33^{rd}$ partial product obtained when a 64 by 64 integer multiply is implemented using Booth's Encoding Algorithm.

In one or more embodiments of the invention, when the arithmetic operation is not a integer multiply (e.g., when the operation is a floating point multiply-add), term 3 (202) is directly input into the alignment shifter, because term 3 (202) is the term to be added to the result of the multiplication of term 1 and term 2. Thus, in one or more embodiments of the invention, the alignment shifter is utilized for both integer multiplication and for floating point multiply-add operations.

Figure 3:
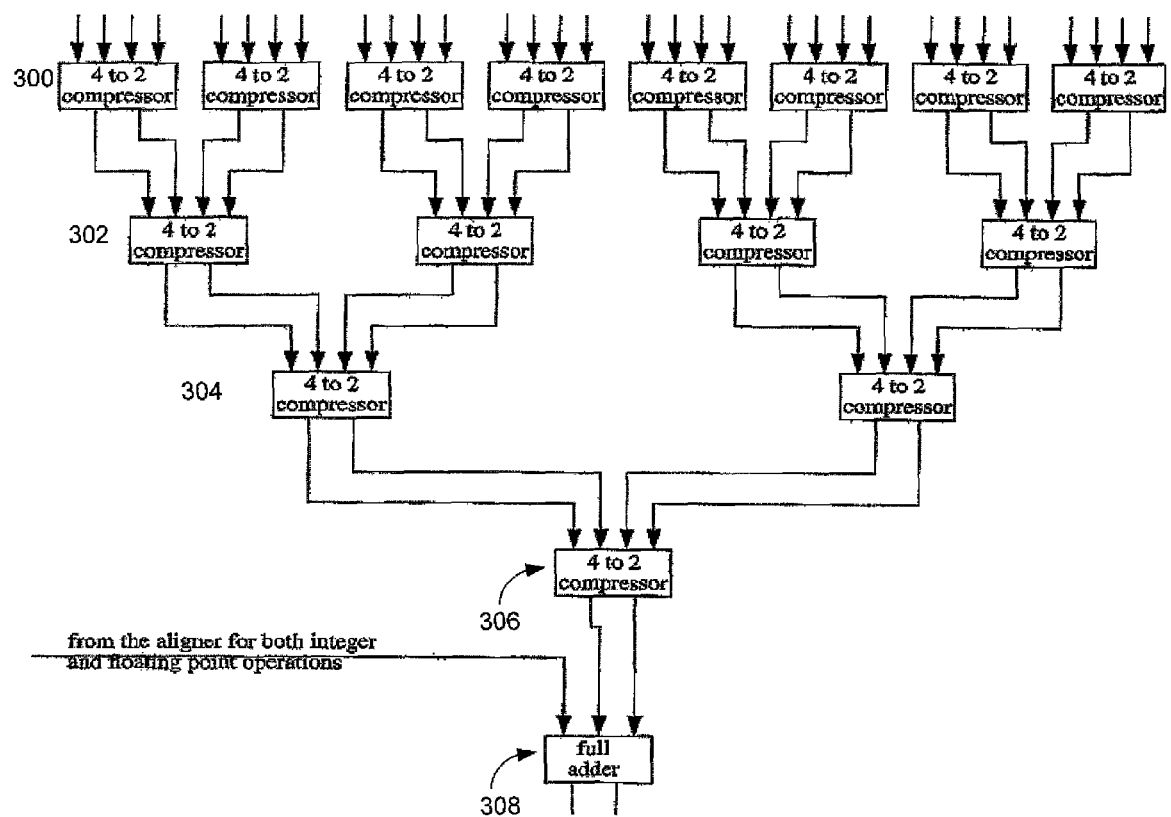
FIG. 3 shows a 64 by 64 bit multiply array in accordance with one or more embodiments of the invention.

FIG. 3 shows a carry save adder (300) for a 64×64 bit multiply array in accordance with one or more embodiments of the invention. As mentioned above, carry save adders include a plurality of 4 to 2 compressors, for efficiency, and are configured to reduce the original number of partial products in a multiplication operation down to two partial products. For example, for a 64×64 bit integer multiply operation using Booth Encoding, the carry save adder is responsible for reducing 32 of the original 33 partial products down to 2 partial products.

Those skilled in the art will appreciate that while FIG. 3 shows an example of a carry save adder, embodiments of the invention are not limited to the use of a carry-save adder, as shown in FIG. 3. Rather, embodiments of the invention may be implemented with any suitable carry save adder or other method (that may or may not employ 4 to 2 compressors, e.g., the more efficient 5 to 3 compressors may be used) that is capable of adding a number of multiplication partial products to obtain two partial products.

Continuing with FIG. 3, four levels of 4 to 2 compressors are shown. On the first level (302) of 4 to 2 compressors, each 4 to 2 compressor takes four of the original partial products as input, adds them together, and outputs 2 partial products. Thus, in the first level (302), 32 of the original partial products are reduced to 16 partial products. Similarly, in the next level (304), the 16 partial products are reduced to 8 partial products. In the third level (306), the 8 partial products are reduced to 4. Finally, in the last level (the fourth level of 4 to 2 compressors), the 4 remaining partial products are reduced to 2 partial products. The $33^{rd}$ partial product, which has up until this stage not been considered, is added into the full adder (308), along with the two remaining partial products to obtain a final result that is then fed into a carry look-ahead adder or similar type of digital adder (not shown in FIG. 3).

In one or more embodiments of the invention, the hardware structure shown in FIG. 3 provides an efficient method for performing both floating point multiply-add operations and 64×64 bit integer multiplication using Booth Encoding. For example, consider a floating point multiply-add operation. A double precision floating point multiply-add operation requires a 53×53 mantissa, which can be placed anywhere in the multiplication array. In this case, using Booth Encoding (110), such a multiplication results in 27 partial products. However, because the hardware is large enough to accommodate 33 partial products, the hardware creates 33 partial products for the floating point operation, where the additional partial products are all zeros (i.e., only 27 of the partial products include data). After the 27 partial products are added to reduce the partial products down to two, the shifted third term is added in to obtain a total of three partial products, which the full adders (308) add together. Alternatively, for an integer multiplication, a 64×64 integer operation is fairly common. In this case, typically, the integers are multiplied, and no third term is added to the product result. To multiply two 64 bit binary numbers together, using Booth Encoding, 33 partial products are obtained. Accounting for both of the above scenarios in hardware, using 4 to 2 compressors, provides a more efficient hardware implementation that is faster and less power consuming than the use of full adders or other types of digital adders.

Figure 4:
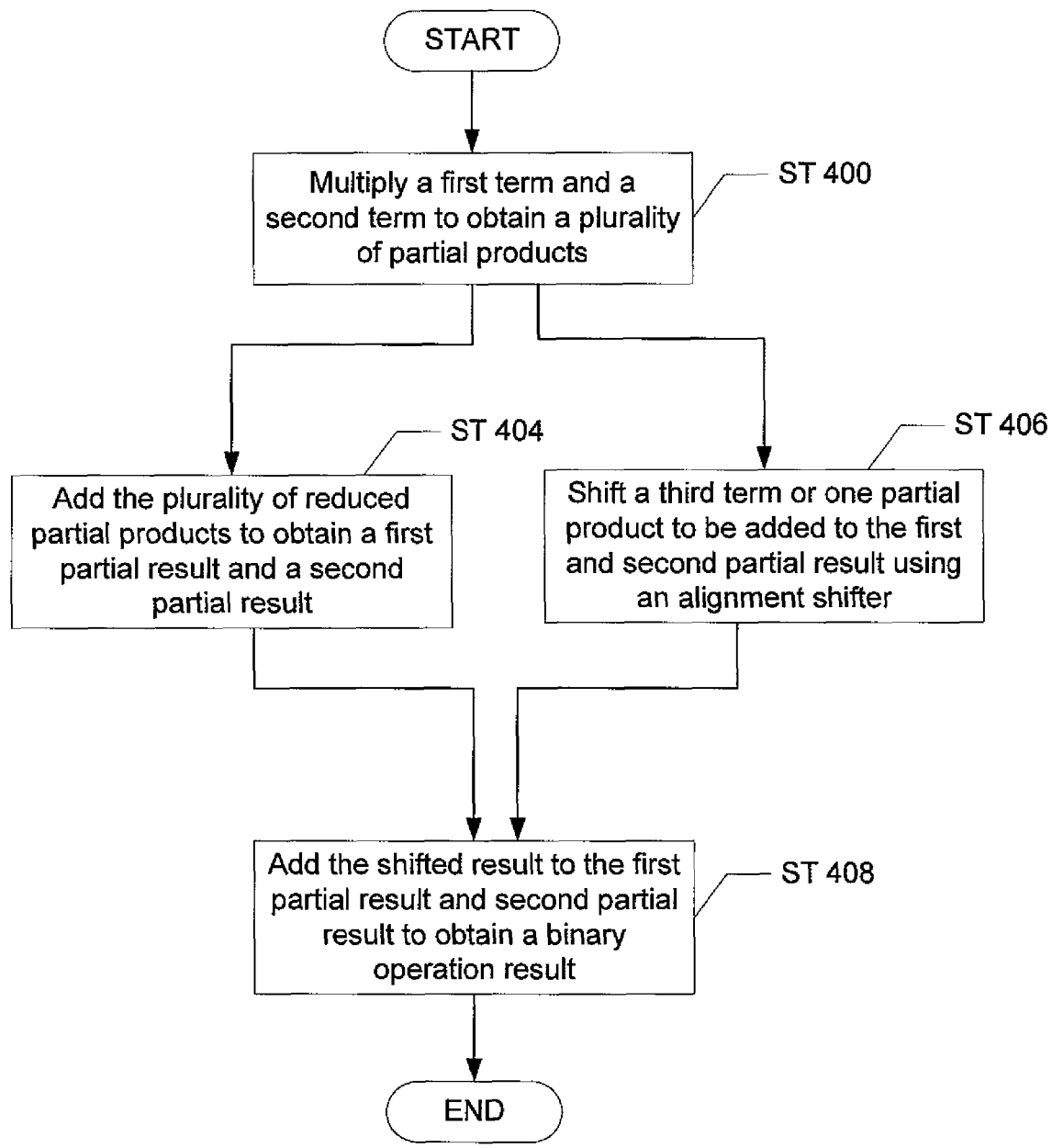
FIG. 4 shows a flow chart in accordance with one or more embodiments of the invention.
Figure 5:
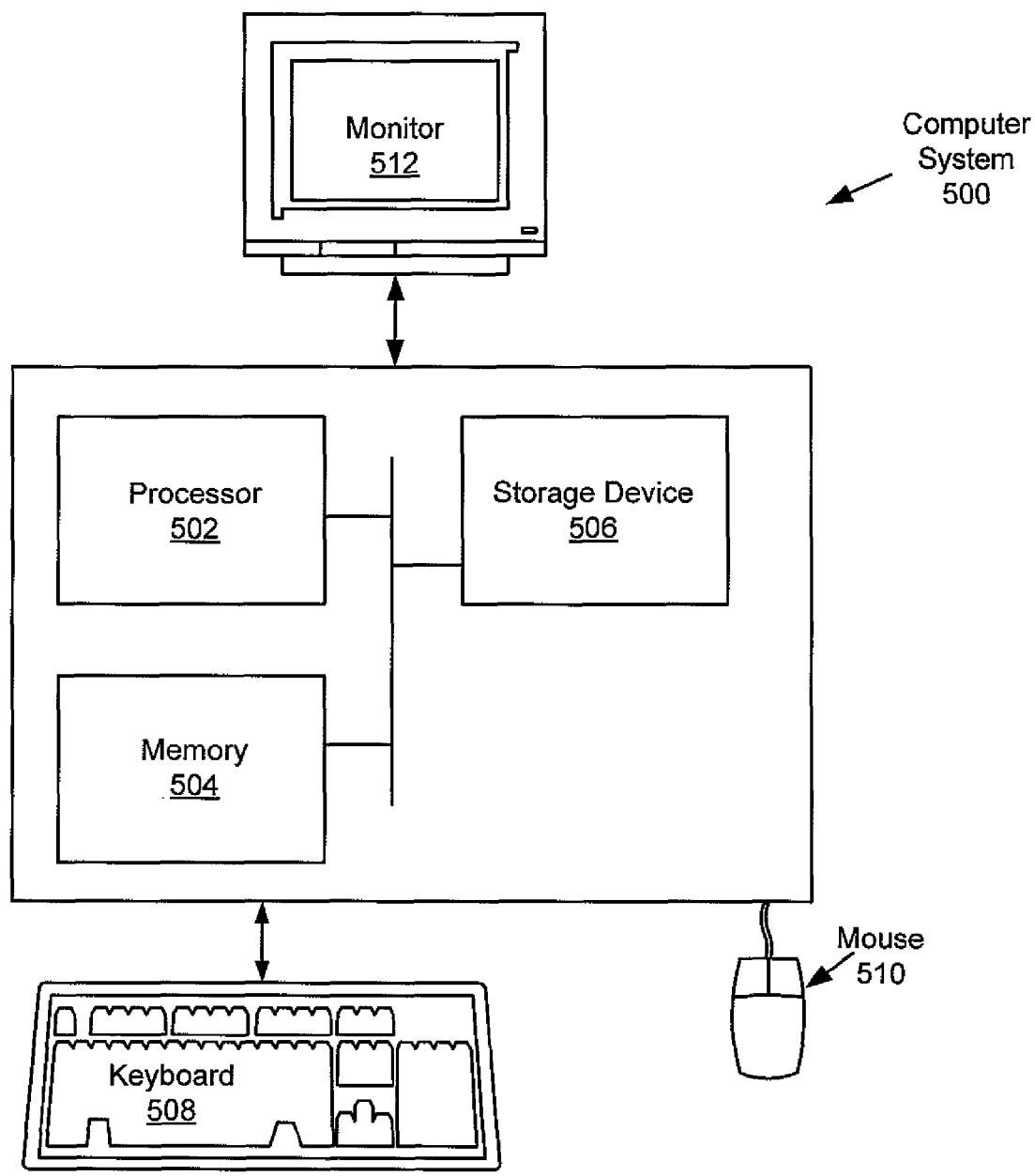
FIG. 5 shows a computer system in accordance with one or more embodiments of the invention.

FIG. 4 shows a flow chart in accordance with one or more embodiments of the invention. Initially, a plurality of partial products for the start of the multiplication of a first binary term and a second binary term are obtained (ST 400). In one or more embodiments of the invention, in ST 400, the plurality of partial products may be obtained using Booth Encoding. Those skilled in the art will appreciate that each partial product is placed such that the binary point of each partial product is aligned with the binary point of the previous partial product. Subsequently, in one or more embodiments of the invention, the partial products may be reduced using a carry save adder, which is well know in the art. This reduction results in two partial products, known as the first partial result and the second partial result (ST 404). In the case of a carry save adder that implements 4 to 2 compressors, partial products are input four at a time and the 4 to 2 compressor outputs 2 partial products. Thus, four partial products are reduced to two by each 4 to 2 compressor. As described above in FIG. 3, to reduce 32 partial products down to two, for example, 4 levels of 4 to 2 compressors may be used.

Concurrently with ST 404, either the third term or a $33^{rd}$ partial product is shifted (ST 406). The input into the alignment shifter is shifted so as to align the binary point of the shifted term with the appropriate binary point of the first and second partial results. Lastly, the shifted term is added to the first and second partial results to obtain a binary operation result (ST 408). In one or more embodiments of the invention, the shifted term may be a $33^{rd}$ partial product obtained in a 64 by 64 bit integer multiply using Booth's Encoding Algorithm. Alternatively, the shifted term may be the addition term that is added to the result of the multiplication of a first and a second term in a floating point multiply-add operation. Those skilled in the art will appreciate that the input into the alignment shifter (i.e., the term to be shifted) may be any extra term or a term that is part of the binary operation that needs to be shifted and added to the product of a first term and a second term.

Those skilled in the art will appreciate that the above-described embodiments of the invention may be implemented in scenarios in which Booth Encoding is employed, and in scenarios which do not involve Booth Encoding. However, embodiments of the invention can be applied to any partial product term that may or may not result from employing Booth's Encoding Algorithm. For example, any other suitable algorithm for obtaining partial products that need to be added together in a multiply operation may be employed. Embodiments of the invention focus on reducing the time necessary to add a large number of partial products together in hardware, by reducing the number of levels of compressors required to bring the original number of partial products down to two. This can be useful for and implemented in scenarios that employ Booth Encoding and in scenarios that do not use Booth Encoding.

Further, those skilled in the art will appreciate that the aforementioned embodiments of the invention can be implemented in a variety of arithmetic operations. For example, embodiments of the invention apply to single precision floating point operations, double precision floating point operations, integer operations, and any other suitable binary operation standard.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed. Further, software instructions to perform embodiments of the invention may be stored on a tangible computer readable medium such as a compact disc (CD), a diskette, a tape, or any other suitable tangible computer readable storage device.

Embodiments of the invention provide a system and method for efficient hardware implementation of binary operations. Specifically, embodiments of the invention use typically idle hardware (i.e., the alignment shifter, which is typically only used during a floating point multiply-add operation) to add the $33^{rd}$ Booth Encoded partial product to the two partial product results obtained from the binary multiplication of two terms. Thus, hardware which is already present in a CPU/ALU of a computing system, and is used for floating point multiply-add operations, is now also used in 64 by 64 bit integer multiply operations, when the 64 by 64 bit integer multiply results in a $33^{rd}$ Booth Encoded term. The $33^{rd}$ Booth Encoded third term, which is one of the partial products that needs to be added to the other partial products resulting from the multiplication of a first term and a second term, is thought of as the term C in a multiply-add operation that is represented by (Term A×Term B)+Term C. Said another way, a 64 by 64 bit integer multiply operation is implemented without the need for any addition hardware components because in a 64 by 64 bit integer multiply, there is no additional term to be added (no Term C exists because the integer multiply does not have a third term to be added to the result of the multiplication), so the $33^{rd}$ partial product is taken as the additional Term C and is added through the alignment shifter. In a floating point multiply-add operation, there is an additional term (Term C) that is added to the result of the multiplication of term A×term B, but there is no $33^{rd}$ partial product term, because only 27 partial products are obtained when Booth Encoding is used to reduce the number of partial products obtained in a 53×53 floating point multiply-add operation. Thus, both binary operations (the integer multiply and the floating point multiply-add) can interchangeably use the alignment shifter to obtain the complete operation result, where the term that is shifted and added is theoretically a different entity in each case (i.e., either a third term to be added or the $33^{rd}$ partial product).

Further, embodiments of the invention implement the above binary operations using a 4-level carry save adder (e.g., an adder with 4 levels of 4 to 2 compressors) to reduce the number of original partial products (e.g., 32 partial products for a 64×64 bit integer multiply operation, using Booth Encoding) to 2 partial product results. Similarly, the same 4 level carry save adder structure is used to implement floating point multiply-add operations, thereby allowing binary operations to be performed more efficiently and consume less power.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system for computing a binary operation involving a first term multiplied by a second term to obtain a product, wherein the product is conditionally added to a third term in a central processing unit, wherein the central processing unit comprises:
   a carry save adder configured to add a plurality of partial products obtained from the product of the first term and the second term to obtain a first partial result and a second partial result; and
   a multiplexer configured to output one selected from the group consisting of the second term, the third term, and zero; and
   an alignment shifter configured to shift an output of the multiplexer to align the output of the multiplexer with the first partial result and the second partial result to obtain a shifted term, wherein the shifted term, the first partial result and the second partial result are added together to obtain a result of the binary operation, wherein the plurality of partial products are reduced using Booth's Encoding Algorithm, and wherein the third term to be aligned is a $33^{rd}$ partial product resulting from an application of Booth's Encoding Algorithm, and wherein the $33^{rd}$ partial product is output by multiplexer, shifted by the alignment shifter, and added to the first partial result and the second partial result.

2. The computer system of claim 1, wherein the carry save adder comprises four levels of 4 to 2 compressors.

3. The computer system of claim 1, wherein the binary operation is a 64×64 bit integer multiply operation.

4. The computer system of claim 3, wherein the multiplexer is configured to output zero when a most significant bit of the first term is a zero.

5. The computer system of claim 3, wherein the multiplexer is configured to output the second term and a most significant bit of the first term, when a most significant bit of the first term is a one.

6. The system of claim 1, wherein the binary operation is a floating point multiply-add operation.

7. The system of claim 6, wherein the third term is output from the multiplexer into the alignment shifter, wherein the third term is added to the first partial result and the second partial result.

8. A method for performing a binary operation, comprising:

obtaining a first term to be multiplied by a second term to obtain a plurality of partial products, wherein the plurality of partial products are added together using a carry save adder to obtain a first partial result and a second partial result;

shifting a third term using an alignment shifter to obtain a shifted term;

adding the shifted term to the first partial result and the second partial result, wherein the binary operation is one selected from a group consisting of an integer multiply operation and a floating point multiply-add operation, wherein the plurality of partial products is obtained reduced using Booth's Encoding Algorithm, wherein the shifted term is one selected from a group consisting of a partial product obtained when executing an integer multiply operation and an addition term when executing a floating point multiply-add operation, and wherein the shifted term, the first partial result, and the second partial result are added together to obtain a binary operation result, wherein the third term to be aligned is a $33^{rd}$ partial product resulting from an application of Booth's Encoding Algorithm, and wherein the $33^{rd}$ partial product is output by the multiplexer, shifted by the alignment shifter, and added to the first partial result and the second partial result.

9. The method of claim 8, wherein the plurality of partial products are reduced using a carry save adder comprising four levels of 4 to 2 compressors.

10. The method of claim 8, wherein the alignment shifter and the carry save adder are part of a central processing unit within a computing device.

* * * * *